2,951,406
BROKEN NIPPLE EXTRACTOR

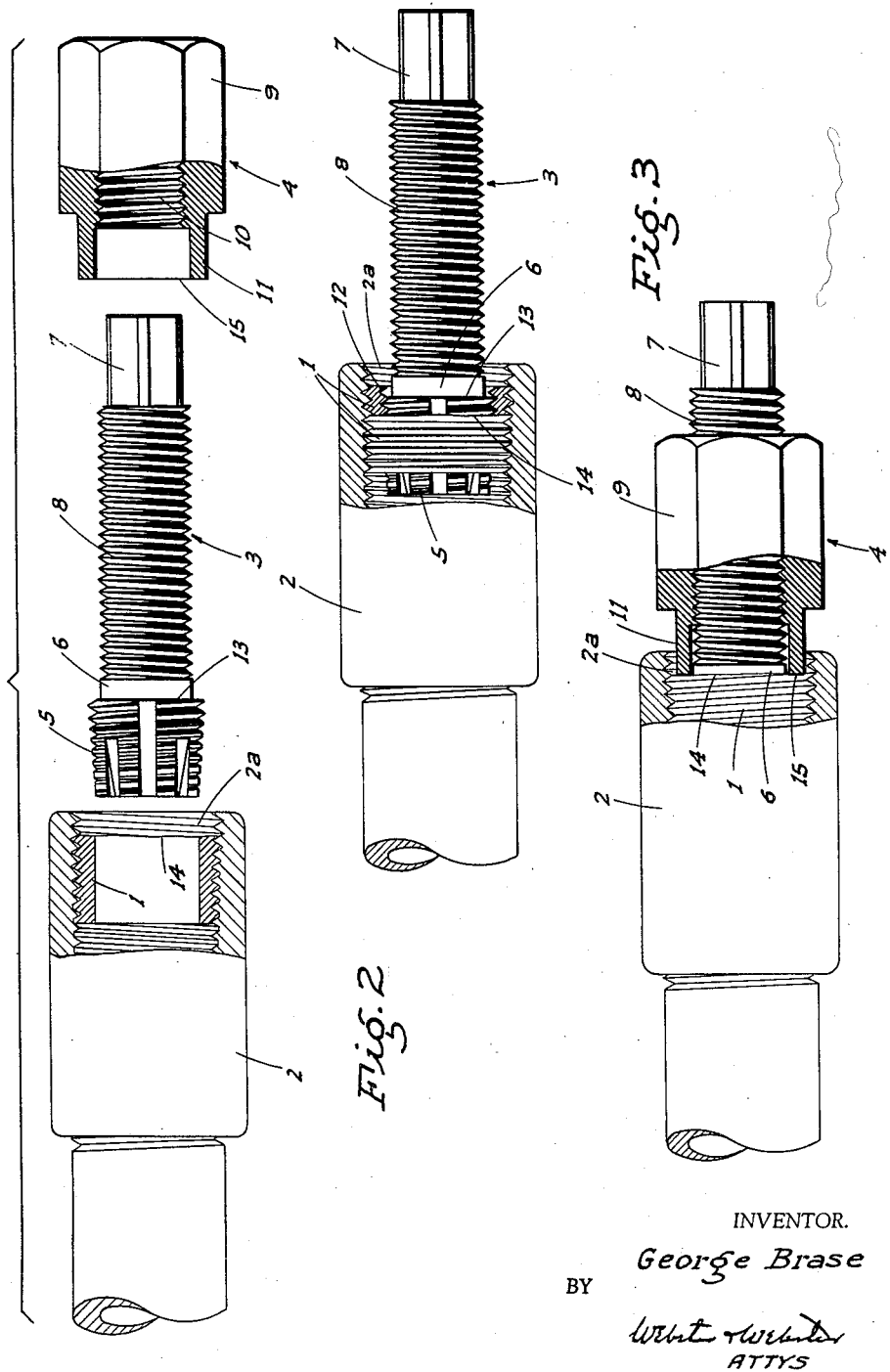

George Brase, 221 Mason St., San Francisco, Calif., assignor of twenty percent to Alice F. Jones Filed Aug. 24, 1959, Ser. No. 835,541

1 Claim. (Cl. 81—71)

This invention relates to plumbers' tools, and particularly to one for removing a broken pipe or nipple end from a member into which the pipe or nipple was originally screwed for operative connection thereto.

Due to the weakening of a pipe or nipple by the threading of the end thereof, it frequently happens that because of corrosion or crystallization after a certain period of use, such pipe or nipple breaks off at or inside the coupling or other member; thus leaving the broken-off end still screwed tightly in said member where no pipe or similar wrench can engage and unscrew such broken end.

The principal object of my invention is to provide a tool by means of which a broken pipe or nipple end may be quickly and easily removed from the member in which it is screwed, without any damage being done to said member, such as mutilating the internal threading thereof, which would lessen or destroy its further usefulness.

Another object of the invention is to provide a device for the purpose whether the broken end of the pipe-end is at or outside the outer face of the member in which it is screwed, or is some distance back or inside from said outer face.

It is also an object of the invention to provide a broken nipple extractor which is designed for ease and economy of manufacture.

Still another object of the invention is to provide a practical and reliable broken nipple extractor, and one which will be exceedingly effective for the purpose for which it is designed.

These objects are accomplished by means of such structure and relative arrangement of parts as will fully appear by a perusal of the following specification and claim.

In the drawings:

Fig. 1 is a side elevation of a pipe coupling, with a broken pipe-end therein, together with the parts of the tool in separated relation to each other and to the coupling; said coupling and one part of the tool being partly broken out and in section.

Fig. 2 is a side elevation of the broken-out coupling and pipe-end, showing one part of the tool as engaged with the pipe-end in said coupling.

Fig. 3 is a similar view, showing the other part of the tool as engaged with said one part and with the pipe-end.

Referring now more particularly to the drawings, and to the characters of reference marked thereon, the member from which the broken pipe-end 1 is to be extracted is here shown as being a conventional pipe coupling 2, but obviously such member may be any body to which a pipe has been connected by screwing such pipe into the tapped bore 2a of the body.

The improved tool for extracting the pipe-end 1 consists of a pair of initially separate but cooperating members, indicated generally at 3 and 4. Member 3 comprises a short conventional form of pipe tap 5 of a size to engage in and tap the pipe-end 1, and having its threads cut in the same direction as those of said pipe-end. The tap is integral with an elongated, relatively small-diameter shank 6, which at its outer end is provided with a short non-circular portion 7 adapted for wrench or brace engagement whereby to turn the tap. The shank 6, for substantially its full length, is threaded in a direction opposite that of the tap threads, as at 8.

The other member 4 of the tool comprises a somewhat elongated nut 9, tapped with threads 10 to match and of course cut in the same direction as those on the shank 6. Member 4 is also formed on its forward end with a circular non-threaded neck 11 of an internal size to pass over the shank threads without interference, and of an external size such that it may pass into the tapped bore 2a of the coupling 2 without interference.

In operation, the tap 5 is first run through the pipe-end 1, forming threads 12 therein, until the rear large end 13 of the tap is inwardly of the outer broken-off end 14 of the pipe-end 1, as shown in Fig. 2. The nut 9 is then advanced onto the shank 6 until the peripheral outer end edge 15 of the neck 11 clampingly engages the outer end face or edge 14 of the pipe-end 1, as shown in Fig. 3.

Such clamping action of course also pulls the tap threads firmly against the threads 12 cut thereby in the pipe-end 1. Upon further turning of the nut 9 in the same direction, the pipe-end 1—being thus in effect locked to the tap and to the nut—is retracted from within the coupling without damage to the threads thereof.

The length of the neck 11 is sufficient to enable the same to project into the bore 2a of the coupling and engage the pipe-end 1 regardless of how far the outer broken end edge 14 thereof may be within the coupling.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

An extractor for a pipe-end threaded into a tapped bore in a body and terminating at its outer end adjacent the outer end of said bore; the extractor comprising a pipe tap threaded in the same direction as the pipe-end and adapted to be run through the pipe-end from said outer end thereof in threaded relation therewith, a shank projecting from the tap and threaded in the direction opposite the threads of the tap, a nut tapped to engage the threads of the shank, and a neck projecting from the forward end of the nut to clampingly engage the outer edge of the pipe-end and of an outside diameter less than that of the bore of the body whereby the neck may enter said bore and engage the outer edge of the pipe-end when such edge is within the body bore.

References Cited in the file of this patent

UNITED STATES PATENTS

| | | |
|---|---|---|
| 836,478 | Woerner | Nov. 20, 1906 |
| 2,013,923 | Naccarato | Sept. 10, 1935 |
| 2,550,866 | Rosan | May 1, 1951 |
| 2,684,606 | Brawley | July 27, 1954 |